UNITED STATES PATENT OFFICE.

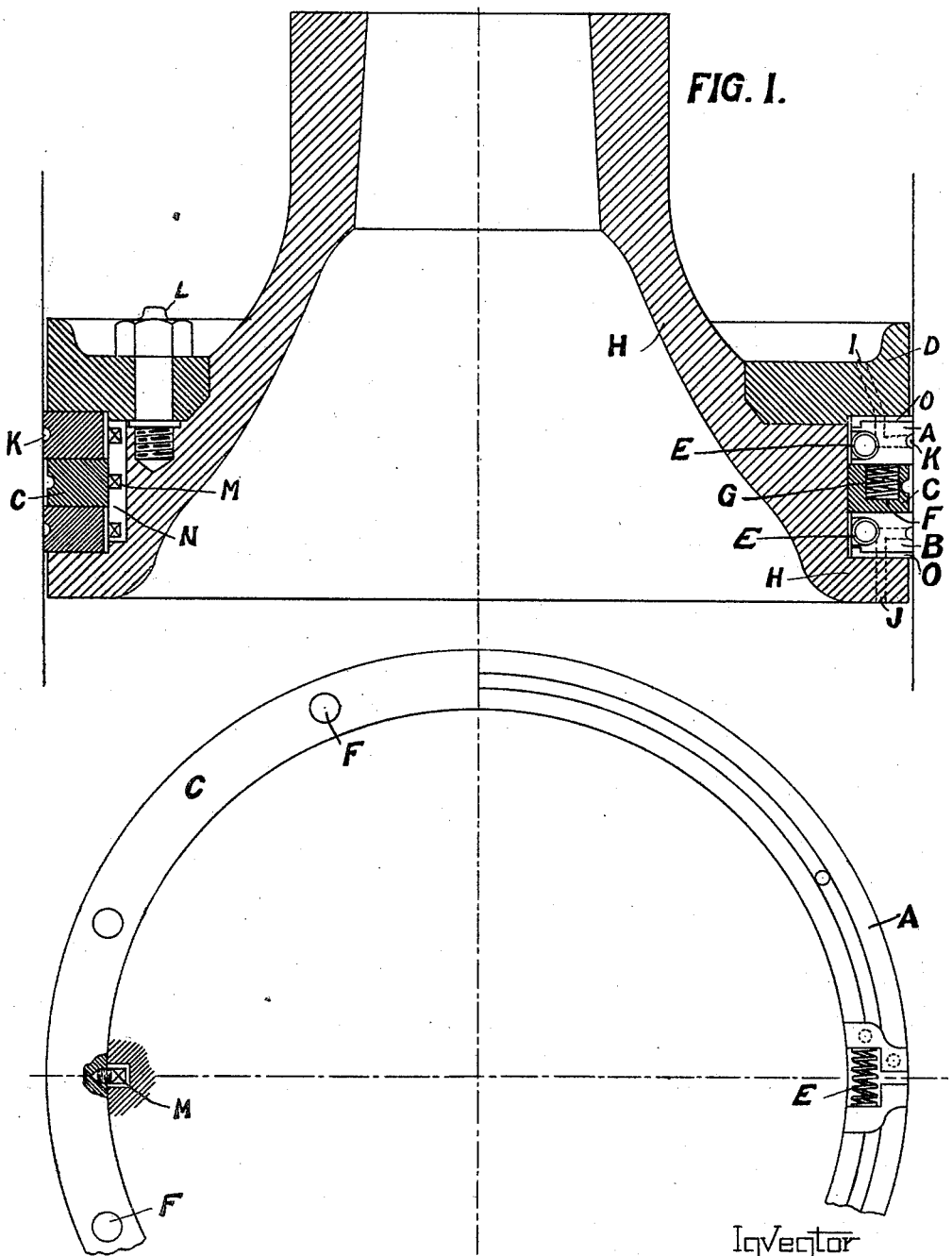

EDWIN BERRY, OF OXTON, BIRKENHEAD, ENGLAND, ASSIGNOR TO JOHN STOREY, OF LIVERPOOL, ENGLAND.

STEAM OR OTHER PISTON.

SPECIFICATION forming part of Letters Patent No. 693,777, dated February 18, 1902.

Application filed November 1, 1901. Serial No. 80,764. (No model.)

*To all whom it may concern:*

Be it known that I, EDWIN BERRY, a subject of the King of Great Britain, residing at Oxton, Birkenhead, in the county of Chester, England, have invented certain new and useful Improvements in Steam or other Pistons, (for which application for a patent has been made in England, No. 5,056, dated March 9, 1901,) of which the following is a specification.

The importance of securing a steam-tight piston with the least friction on the cylinder is a matter of considerable importance, as any of the power of the engine employed in mere piston friction is altogether lost.

Now the present invention is designed to considerably reduce or nullify friction while preventing leakage of steam or other fluid between the piston-head and the cylinder in which it works.

The invention will be understood from the following description, reference being had to the accompanying drawings, in which—

Figure 1 is a vertical section of a piston with my invention applied thereto; Fig. 2, a part plan of the solid ring with a small part in section and a part plan of split ring with its cod-piece removed.

Referring to the figures, I form the piston with a groove, into which two split rings A B are inserted, with a solid or unsplit ring C between. These are held in place by a junk-ring D, bolted to the piston-head by screws. The solid ring C and the junk-ring D form a guide for the piston. The split rings A B are preferably a little larger in diameter than the cylinder itself and are expanded by spiral springs E, located at the opposite and adjacent ends of each ring A, so that the rings are pressed circumferentially outward with some force against the surface of the cylinder. The place where one ring is cut can be made to break joint with the other ring, if desired, so as to prevent any steam which leaks through the opening where one ring is cut from passing through the corresponding opening in the other ring. The rings may have butt or lap joints, whichever is desired. The middle ring C, which is not split, but fits onto the piston-body, has transverse recesses F in it at intervals, in which spiral springs G are also placed, and these are arranged to press the ring A up against the junk-ring D and the solid ring C against the split ring B and both the rings C and B against the shoulder of the piston-head. The springs E in the split rings A B thus press the said rings circumferentially outward, while the other springs G press the rings A B laterally or sidewise. Small holes I J pass from each side of the piston H to the rubbing-surface of each ring A B, and through these steam is admitted into a channel or groove K, made in the rubbing-surface of each ring, and thus the steam acts to press the rings A B inward so long as steam is acting upon each side of the piston H. Thus the spring-pressure is counteracted to a great extent, and the pressure on each side of the rings is nearly balanced, though the spring-pressure should perhaps slightly exceed the counteracting pressure of the steam. By this arrangement there is no unnecessary pressure of the rings against the cylinders, and therefore no undue wear, and also this arrangement prevents the formation of shoulders at the ends of the cylinders. The rings are forced outward by their own elasticity and that of the springs E against the surface of the cylinder, thus providing a steam-tight packing, and as the springs constantly exert an expansive force the rings A B take up any wear that may take place, both in respect of the cylinder and the packing. The pistons H are preferably made of cast-steel, the junk-rings D of cast-iron, and the packing-rings A B C of cast-iron. The split rings A B can move freely in the groove, and the laterally-placed springs E exert side pressure which keep them abutting against the shoulder and junk-ring. The junk-ring remains fixed in its place after it has been screwed up by the screws L, the packing requiring no further attention after the first putting together of the piston. The configuration of the piston corresponds by preference with the configuration of the cylinder-covers, thereby avoiding waste of steam. In the ordinary arrangements hitherto used the initial steam-pressure leaking in past the rings forces the split rings outward against the cylinderbarrel with such force as to cause considerable friction and barreling of cylinder; but by the present invention this action is partly counterbalanced by initial steam being introduced into the grooves K in the split ring A and B. The initial steam thus introduced into the grooves K nullifies and counteracts the outward pressure on the rings, and the steam in the grooves acts as an efficient lubricant for the rings, together reducing friction to a minimum while forming a steam-tight packing. To prevent the rings from turning, they are each fitted with a small pin or feather M, which fits into the groove N in the piston-body. Cod-pieces O are fitted at sides of split rings A B to cover the split.

In thus describing the invention I wish it to be understood that I do not confine myself to the exact arrangements described, as these can be modified without departing from the nature of the invention. Thus, for example, it is obvious that the piston might be provided with grooves without a junk-ring into which packing-rings can be sprung into place and the springs G for exerting lateral pressure passed through holes in a rib or flange between the grooves. Furthermore, the small holes for the steam might, if desired, be passed from opposite sides of the piston-body to each of the packing-rings. I do not limit myself to using two split rings, as I can provide any suitable number thereof mounted in the piston-body and alternating with solid rings. The invention is not confined to steam-pistons, as it can be applied to pistons worked by other fluid-pressures.

I declare that what I claim is—

1. In a piston of the character described, the combination with the body of the piston, of split packing-rings mounted thereon, a solid unsplit ring between the split rings, springs between the adjacent ends of the split rings pressing said rings circumferentially outward against the cylinder, and springs in the solid ring pressing the split rings laterally, the body of the piston and the rings being provided with holes or passages leading from the face of the piston to the rubbing-surface of the split ring whereby steam passing through said passages will counterbalance the outward spring-pressure and thus lubricate and considerably reduce or nullify friction, substantially as described.

2. In a piston of the character described, the combination with the split rings, of a solid ring between them, the body of the piston provided with a groove, and pins or feathers on the rings fitting into said groove, whereby the rings are prevented from turning, substantially as described.

In witness whereof I have hereunto signed my name, this 21st day of October, 1901, in the presence of two subscribing witnesses.

EDWIN BERRY.

Witnesses:
G. C. DYMOND,
JOHN McLACHLAN.